United States Patent
Ergler et al.

(10) Patent No.: US 9,547,091 B2
(45) Date of Patent: Jan. 17, 2017

(54) DETECTOR MODULE FOR AN X-RAY DETECTOR

(71) Applicant: Siemens Aktiengesellschaft, München (DE)

(72) Inventors: Thorsten Ergler, Erlangen (DE); Edgar Göderer, Forchheim (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 14/754,760

(22) Filed: Jun. 30, 2015

(65) Prior Publication Data

US 2016/0018536 A1    Jan. 21, 2016

(30) Foreign Application Priority Data

Jul. 15, 2014  (DE) .......................... 10 2014 213 738

(51) Int. Cl.
  *G01T 1/24*  (2006.01)

(52) U.S. Cl.
  CPC .............. *G01T 1/242* (2013.01); *G01T 1/243* (2013.01); *G01T 1/244* (2013.01)

(58) Field of Classification Search
  CPC .................................. G01T 1/242; G01T 1/244
  USPC .................................................. 250/370.09
  See application file for complete search history.

(56) References Cited

U.S. PATENT DOCUMENTS

| 4,563,098 A | 1/1986 | Bartran |
| 6,653,835 B2 | 11/2003 | Roeckelein |
| 7,576,330 B1 | 8/2009 | Lacey et al. |
| 7,733,571 B1 * | 6/2010 | Li .......................... G02B 27/01 359/262 |
| 2003/0043959 A1 * | 3/2003 | Wischmann .......... G01T 1/2018 378/19 |
| 2006/0208917 A1 * | 9/2006 | Schumann ......... G01N 21/3151 340/632 |
| 2009/0086052 A1 | 4/2009 | Nakata |
| 2011/0049381 A1 | 3/2011 | Luhta |
| 2013/0248729 A1 * | 9/2013 | Hannemann ............ G01T 1/244 250/394 |

FOREIGN PATENT DOCUMENTS

| DE | 19700731 C1 | 9/1998 |
| DE | 10138913 | 3/2003 |
| DE | 102009003792 | 11/2009 |
| DE | 102012204766.2 | * 9/2013 ............. G01T 1/244 |

* cited by examiner

*Primary Examiner* — David Porta
*Assistant Examiner* — Gisselle Gutierrez
(74) *Attorney, Agent, or Firm* — Harness, Dickey & Pierce, P.L.C.

(57) ABSTRACT

A detector module is disclosed for an X-ray detector. In an embodiment, the detector module includes a number of sensor boards arranged adjacent to each other on a module support, each sensor board including, in a stack formation, a sensor layer having a sensor surface and a support ceramic by which the sensor layer is thermally coupled to the module support. A number of elements are arranged on the side of the support ceramic that faces the module support in a stack formation and at least one heating element is included which, in a plane of projection perpendicular to the stack formation, at least partially covers at least the area of the support ceramic that is free from the elements. An X-ray detector including a number of detector modules is also disclosed.

20 Claims, 3 Drawing Sheets

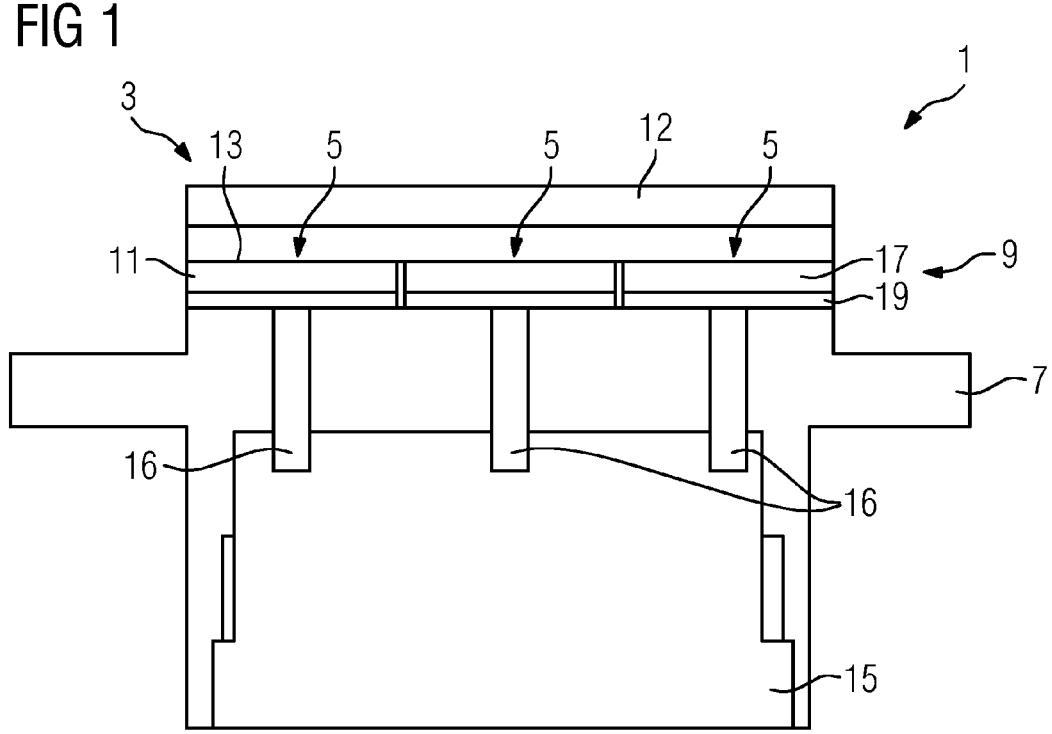
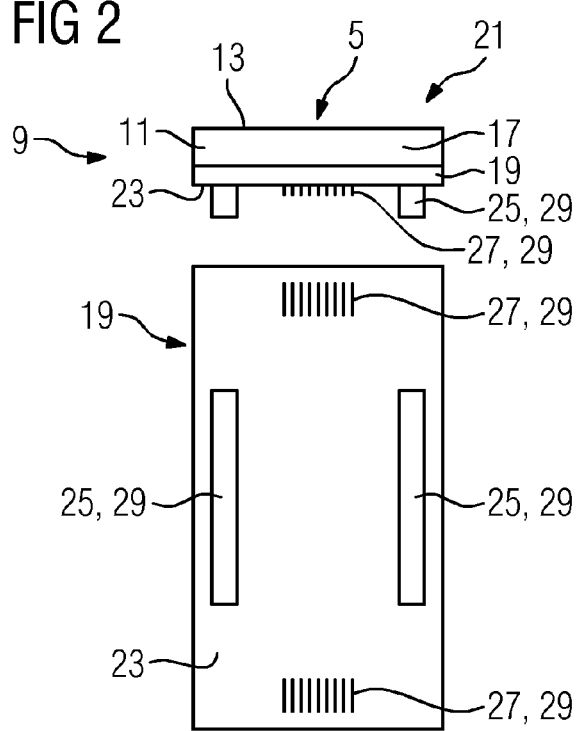

DETECTOR MODULE FOR AN X-RAY DETECTOR

PRIORITY STATEMENT

The present application hereby claims priority under 35 U.S.C. §119 to German patent application number DE 102014213738.1 filed Jul. 15, 2014, the entire contents of which are hereby incorporated herein by reference.

FIELD

At least one embodiment of the invention generally relates to a detector module for an X-ray detector. At least one embodiment of the invention also generally relates to an X-ray detector comprising a plurality of detector modules.

BACKGROUND

An X-ray detector, in particular a quanta-counting X-ray detector, is used in imaging applications. An X-ray detector of this kind is used by way of example therefore for computed tomography recordings in medical imaging to generate a spatial image of an examination region of a patient.

An X-ray detector, whose sensor layer is designed as a direct-converting semi-conductor layer, enables a quantitative and energy-selective detection of individual X-ray quanta. Pairs of electron holes, i.e. pairs of negative and positive charge carriers, are generated in the sensor layer on the penetration of X-ray radiation. The charge carriers are separated and move to the electrodes or surfaces of the sensor layer with the opposite charge respectively due to a voltage applied to the sensor layer or surface of the sensor layer. The current caused as a result, or a corresponding charge transfer, can be evaluated by an electronic sensor device connected downstream. Semi-conductor materials by way of example in the form of CdTe, CdZnTe, CdTeSe, CdZnTeSe, CdMnTe, GaAs, Si or Ge, which have a high absorption cross-section for X-ray radiation, are suitable for detection of the X-ray quanta.

Large-area X-ray detectors are required in particular for a computed tomograph, for which reason a plurality of comparatively small detector modules with the above-described construction is frequently arranged side by side. These detector modules typically have a sensor surface between 1 cm2 and 4 cm2. To achieve optimally high image quality the detector modules are also arranged with the smallest possible spacing from each other. The voltage applied to the sensor layer or to the sensor surface is fed to the detector modules of an X-ray detector by way of individual power supply channels of the HV supply and is adjusted to a predefined operating voltage.

In the case of direct-converting X-ray detectors, or detector modules with a corresponding construction, the electrical resistance of the sensor material changes with the X-ray flux. This leads to a change in the power loss. A change in the X-ray flux therefore causes a change in temperature in the sensor layer, whereby the energy resolution and the count rate of the X-ray detector are in turn affected. A temperature-dependent count rate drift is a miscount that cannot be corrected and leads to image errors and artifacts in the tomographic scans created from absorption data.

In addition to a change in the temperature of the sensor layer caused over time, the drift behavior of an X-ray detector is also affected by locally different temperatures of the sensor layer. Temperature gradients of this kind result in particular due to uneven heat dissipation in the sensor layer.

An undesirable temperature gradient can also result on the sensor board or in the sensor layer of the corresponding sensor board depending on the operating point of the sensor board. An elevated current through the sensor material which, even without penetrating X-ray radiation, can lead to a high power loss and therefore also to a temperature gradient in the sensor layer, can occur as a function of the respectively chosen setting of the operating parameters, such as the mean operating temperature of the detector module or of the sensor material or the applied supply voltage.

To avoid temperature gradients in the sensor layer, preferably all-over thermal coupling to a heat sink is desirable. In current detector modules cooling is implemented by way of example by cooling ribs in a module support to which the sensor layer can be coupled in a stack formation by way of a support ceramic. The sensor layer can therefore be uniformly heated with all-over coupling of the support ceramic to the module support.

However, all-over coupling is made difficult by components arranged on the bottom of the support ceramic, for example components such as passive elements or connectors for data transfer, and/or by other mechanical indentations used for connection to an electronic sensor device. Since these components impede uniform heat dissipation in the sensor layer the regions of the sensor layer, which are applied to the regions of the support ceramic provided with the components, have a slightly higher temperature during operation than the area that is free from the elements at which the support ceramic is coupled to the module support in a planar manner.

One possibility for avoiding this problem can be achieved by way of example by a change in the geometry of the support ceramic. A support ceramic can therefore be used by way of example which is only partially covered by the sensor layer. On account of its larger area the support ceramic then provides "free" regions to which the above-mentioned components can be attached.

An embodiment of this kind is not possible, however, by way of example in a detector module with a tiled modular construction, without restrictions. In the case of a tiled detector module a plurality of tiles, what are known as sensor boards, are arranged adjacent to each other on a shared module support at a spacing of about 100 μm, with the sensor layers of the sensor boards jointly forming the sensor surface of the detector module. A limitation of the spatial resolution must be accepted with a change in the geometry as described above. The number of sensor boards arranged side by side on a module support would also be reduced owing to the larger area.

SUMMARY

At least one embodiment of the invention includes a detector module in which the temperature of the sensor layer can be stabilized easily and inexpensively while avoiding temperature gradients. At least one embodiment of the invention includes an X-ray detector having a plurality of corresponding detector modules.

At least one embodiment of the invention is directed to a detector module for an X-ray detector having a number of sensor boards arranged adjacent to each other on a module support, wherein each sensor board comprises in a stack formation a sensor layer having a sensor surface, and a support ceramic by which the sensor layer is thermally coupled to the module support, wherein a number of elements is arranged on the side of the support ceramic that faces the module support in a stack formation and wherein at least one heating element is included which, in a plane of projection perpendicular to the stack formation, at least partially covers at least the area of the support ceramic that is free from the elements.

At least one embodiment of the invention is directed to an X-ray detector for imaging an object penetrated by X-ray radiation, comprising a plurality of detector modules according to one of the described embodiments.

Further preferred embodiments for the X-ray detector emerge from the subclaims directed toward the detector module. Advantages cited for the detector module can be transferred analogously to the X-ray detector.

BRIEF DESCRIPTION OF THE DRAWINGS

Example embodiments of the invention will be explained in more detail below with reference to drawings, in which:

FIG. 1 shows in a side view a detector module of an X-ray detector having three adjacent sensor boards, FIG. 2 shows in a side view a detail of a sensor board according to FIG. 1, and in a bottom view the support ceramic of the sensor board.

DETAILED DESCRIPTION OF THE EXAMPLE EMBODIMENTS

Figure 3:
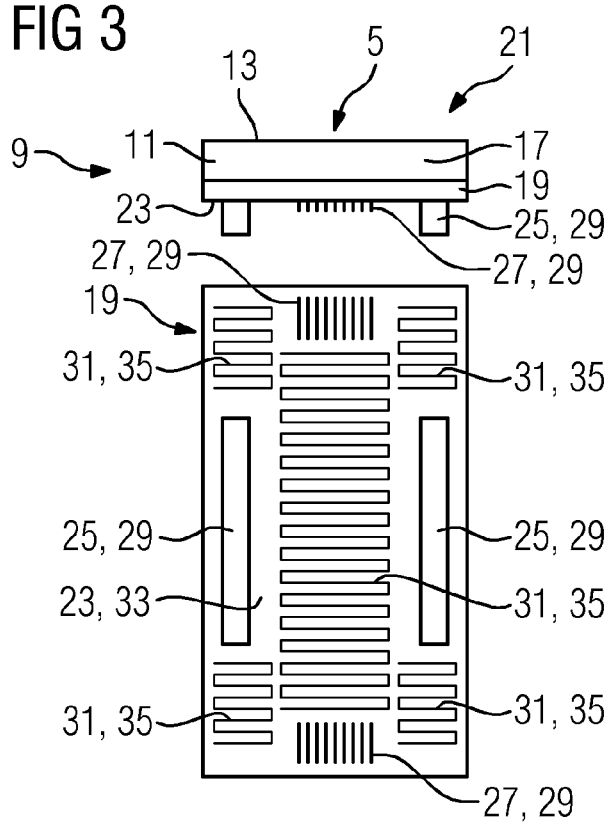
FIG. 3 shows the detail of the sensor board and the bottom view of the support ceramic according to FIG. 2 with a heating element arranged on the bottom of the support ceramic.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks will be stored in a machine or computer readable medium such as a storage medium or non-transitory computer readable medium. A processor(s) will perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments may be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

Note also that the software implemented aspects of the example embodiments may be typically encoded on some form of program storage medium or implemented over some type of transmission medium. The program storage medium (e.g., non-transitory storage medium) may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

At least one embodiment of the invention is directed to a detector module for an X-ray detector having a number of sensor boards arranged adjacent to each other on a module support, wherein each sensor board comprises in a stack formation a sensor layer having a sensor surface, and a support ceramic by which the sensor layer is thermally coupled to the module support, wherein a number of elements is arranged on the side of the support ceramic that faces the module support in a stack formation and wherein at least one heating element is included which, in a plane of projection perpendicular to the stack formation, at least partially covers at least the area of the support ceramic that is free from the elements.

At least one embodiment of the invention starts from the basic consideration that to avoid undesirable image artifacts a temperature distribution in the sensor layer that is as spatially homogeneous as possible is required in addition to a temperature of the sensor layer that is as constant as possible over time.

It is possible to adjust a target temperature in this connection in particular by using heating elements, so a temperature that is constant over a desired period, i.e. by way of example during the course of a measurement that is to be carried out, may be adjusted in the sensor layer with relatively little effort. The occurrence of temperature gradients in the sensor layer due to the heat conduction of locally influential disruptive assemblies or components cannot be eliminated thereby, however.

At least one embodiment of the invention surprisingly recognizes that a heating element used for temperature stabilization of the sensor layer can also be used for the compensation of temperature gradients within the sensor layer. For this purpose a heating element is arranged in such a way that it counteracts the temperatures that are locally different in the sensor layer, i.e. the temperature gradients. For this the heating element, in a plane of projection perpendicular to the stack formation, at least partially covers at least the area of the support ceramic that is free from the elements.

The heating element simultaneously takes on two functions as a result of this arrangement. Firstly, the temperature stabilization is achieved over a desired period by the targeted regulation or control of the heating output of the heating element. Secondly, the occurrence of temperature gradients in the sensor layer is prevented or compensated. The heating element heats at exactly those locations at which heat dissipation by way of the connected cooling element is greater compared to the regions shadowed by components. In other words, the heating element then acts like a component which locally reduces the heat dissipation. The occurrence of component-induced temperature gradients is prevented thereby. As a consequence the heat produced in the sensor layer is dissipated uniformly over the support ceramic at each location.

Due to the targeted regulation or control of the heating output of the heating element it is in particular also possible to compensate temperature gradients on a detector module having a plurality of sensor boards. Temperature gradients of this kind come about by way of example due to a one-sided air supply during cooling of a detector module. In this case the cooling air used for cooling flows along the detector module and is heated. The sensor layer of a sensor board of a detector module arranged at the start of the cooling air zone is accordingly cooled more than the sensor layer of a sensor board arranged at the end of the cooling zone.

To compensate this effect and thus be able to counteract the occurrence of an undesirable temperature gradient within the sensor layer of a detector module over a plurality of adjacent sensor boards, the required heating output is regulated or controlled in such a way that, even with changeable cooling output, the sensor layer of each sensor board has the same temperature at each location over a desired period due to the airflow.

The same applies analogously to an X-ray detector comprising a number of adjacent detector modules each having a number of sensor boards. Temperature gradients of the sensor layer provided as a whole by the X-ray detector can be similarly compensated in that the heating output of each individual heating element can be regulated or controlled in such a way that even with a temperature of the cooling air used that changes along the X-ray detector, uniform temperature control of the sensor layer can be achieved.

The sensor layer of a sensor board is conventionally applied to a read unit in a stack formation. The read unit is in turn applied to the support ceramic which can be used as an intermediate substrate for signal transmission from the read unit to the electronic module device and via which the heat produced in the sensor layer can be led in particular to the metal module support. The dissipation of the heat is homogenized by the heating element arranged in particular on the support ceramic.

In an advantageous embodiment of the invention, the heating element is designed as a meander-shaped heating loop. To attain the desired homogenization of the heat transfer the segments of the heating meander are expediently oriented in such a way that they purposefully counteract a heat gradient and simultaneously serve as a heating resistor for temperature stabilization. In particular the meander-shaped heating loops extend across the free areas between components up to a minimum spacing from the components.

In an advantageous variant, in addition to the faces of the support ceramic free from the elements, the heating element, in a plane of projection perpendicular to the stack formation, also covers those regions at which the elements are arranged. However, the heating element is expediently arranged on the support ceramic in such a way that it encircles this in a plane of projection. With an embodiment of this kind the heating element is preferably arranged at the top of the support ceramic or is embedded in the support ceramic.

A plurality of heating elements is preferably included which are arranged as required in a stack formation in different planes of the support ceramic. The arrangement of the heating elements in the respective planes can be different from each other. The or each heating element is preferably arranged in a stack formation at the top and/or bottom of the support ceramic. Once the support ceramic has been produced, the or even each heating element can therefore easily be arranged thereon.

In a further advantageous embodiment the heating element is embedded in the support ceramic in a stack formation. The heating element can be arranged between respective ceramic layers, wherein the corresponding arrangement expediently occurs during production of the support ceramic.

It is basically the case that the number of heating elements used, along with their arrangement and orientation, is matched to the requirements conditioned by the use of the detector module.

In a preferred embodiment at least one heat-conducting coating is arranged on the support ceramic. A heat-conducting coating of this kind also purposefully counteracts a temperature gradient by supporting uniform heat dissipation of the sensor layer. The heat-conducting coating is arranged here in a stack formation preferably on the top of the support ceramic, i.e. on the side facing the evaluation unit.

Basically the heat-conducting coating can be constructed as a continuous coating which covers the support ceramic all over. In particular the heat-conducting coating is arranged on the support ceramic in such a way that, viewed in projection of the stack, it covers the regions at which the elements are arranged and/or other mechanical indentations are arranged on the support ceramic. For this purpose a coating by way of example is arranged on the top of the support ceramic or embedded in the support ceramic.

The thermal resistance of the support ceramic can be adapted to the temperature profile by way of the heat-conducting coating. Therefore, by way of example in the case of a heat-conductive coating which covers the regions on which components are arranged on the side facing the module support, the heat produced in the sensor layer can be conducted into the sections of the support ceramic located between the coated regions and therefore be dissipated via the coupled module support.

Of course a plurality of heat-conducting coatings may also be included in various planes of the support ceramic. It is likewise expedient in this connection if the heat-conducting coating is embedded in the support ceramic if, in other words, it is arranged between the respective ceramic layers in the case of a support ceramic produced from many layers. The heat-conductive coatings are expediently in addition to the heating element(s).

The heat-conducting coating is expediently designed as a metal coating. The heat-conducting coating preferably comprises one or more metal(s) that are selected from a group that includes copper, nickel, indium, tungsten, aluminum and gold.

A read unit, in particular an ASIC, is preferably arranged in a stack formation between the sensor layer and the support ceramic. The read unit is expediently applied to a support ceramic in a stack formation. In particular the read unit can in turn comprise one or more heating element(s), preferably one or more meander-shaped heating loops. In particular it may also be advantageous for the introduction of the required heating output to be partitioned between the heater in the read unit and the heater in the support ceramic.

The sensor layer expediently comprises a direct-converting semi-conductor material, in particular cadmium telluride (CdTe) or cadmium zinc telluride (CdZnTe). Semi-conductor materials of this kind enable direct conversion of the X-ray radiation that penetrates them into an electrical signal and can be commercially obtained in good quality in terms of charge transport properties and homogeneity.

At least one embodiment of the invention is directed to an X-ray detector for imaging an object penetrated by X-ray radiation, comprising a plurality of von detector modules according to one of the described embodiments.

During operation of an X-ray detector a high voltage is applied in each case to the sensor surface of the detector modules. As described above, the applied high voltage, which is conventionally in a range between 100 V and 2,000 V, enables the separation of the charge carriers generated by the X-ray radiation in the sensor layer and therefore the detection of the penetrating X-ray quanta. The number of detector modules used in an X-ray detector and therewith the number of sensor boards are dependent on the size thereof and on the required sensor overall surface.

The support ceramic is expediently connected in a stack formation via the module support to an electronic sensor device. The data ascertained during an X-ray recording, i.e. the electrical signals from the direct conversion of the X-ray radiation penetrating a sensor surface, can therefore be evaluated directly and continue to be used. For this purpose the electronic sensor device can be read by way of example using an appropriate evaluation routine.

Further preferred embodiments for the X-ray detector emerge from the subclaims directed toward the detector module. Advantages cited for the detector module can be transferred analogously to the X-ray detector.

FIG. 1 shows a detector module 1 of an X-ray detector 3. The detector module 1 has a tiled modular construction in which three sensor boards 5 are arranged adjacent on a shared module support 7.

Each of the three sensor boards 5 comprises in a stack formation 9 a sensor layer 11 having a sensor surface 13. The sensor layer 11 is used for the detection of X-ray radiation. For this purpose, when fitted inside the X-ray detector 3, a high voltage is applied to the sensor surface 13 via an electrode (not shown). The sensor surface 13 is also covered by a collimator 12 which serves to generate a parallel beam path.

The metal module support 7 is connected to an electronic module device 15 from which data lines 16 run to the respective sensor boards 5.

The sensor layers 11 of the three illustrated sensor boards 5 are applied in a stack formation 9 to one read unit 17 in each case. The read units 17 are in turn each applied to a support ceramic 19 which are suitable as an intermediate substrate for signal transmission from the read units 17 to the electronic module device 15 and via which the heat produced in the sensor layers 11 of the sensor boards 5 can be dissipated to the metal module support 7.

Heat dissipation of the sensor layers 11 is made difficult, however, due to components (not shown here) arranged on the support ceramics 19.

FIG. 2 shows a detail 21 of a sensor board 5 having the sensor layer 11, read unit 17 and support ceramic 19 according to FIG. 1 in a side view, and the support ceramic 19 in a bottom view. Both diagrams show connectors 25 and passive elements 27, in the present case coupling capacitors, arranged on the bottom 23 of the support ceramic 19. Connectors 25 and elements 27 are both designated components 29.

It may be seen that, due to the components 29, all-over thermal coupling of the support ceramic 19 to the module support 7 is not possible. At the locations at which the components 29 are arranged there is poorer heat dissipation of the sensor layer 11.

To counteract this problem one or more heating elements can be arranged on the support ceramic 19. FIG. 3 shows the detail 21 of the sensor board 5 according to FIG. 2. In the present case five heating elements 31 designed as meander-shaped heating loops are arranged on the bottom 23 of the support ceramic 19. The heating loops 31 are arranged in such a way that, in a plane of projection 33 perpendicular to the stack formation 9, they cover at least the area 35 of the bottom 23 of the support ceramic 19 that is free from the components 29.

The targeted regulation of the heating output of the heating elements 31 means firstly the temperature of the sensor layer 11 is kept constant over a desired period and secondly, their targeted arranged means the occurrence of temperature gradients in the sensor layer 11 is prevented or compensated. The heating loops 31 reduce the heat dissipation at the component-free regions analogously to component regions at which the thermal coupling is impaired.

Figure 4:
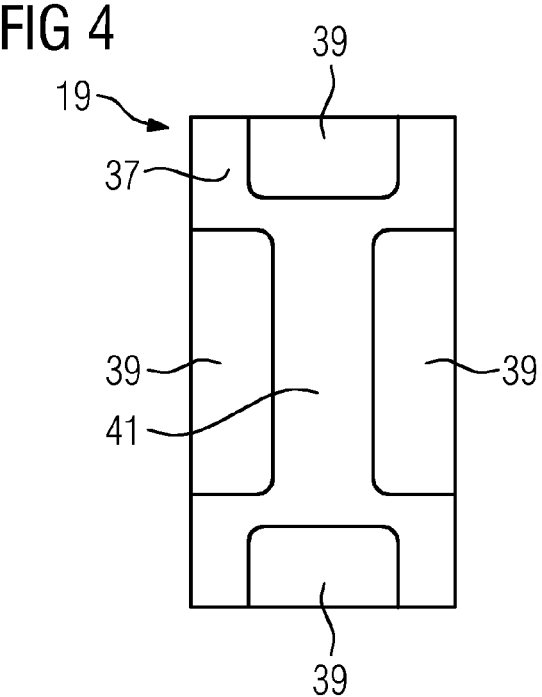
FIG. 4 shows in a plan view the support ceramic of the sensor board according to FIGS. 1 to 3 with a metal coating applied to the top.

FIG. 4 shows a plan view of the support ceramic 19 according to FIG. 3. Four metal coatings 39 of tungsten are provided on the top 37 of the support ceramic 19, which when fitted is directed toward the evaluation unit 17. The heat produced in the sensor layer 11 is conducted into the middle region 41 between the coatings 39 and from there is dissipated via the coupled module support 7 by way of the metal coatings 39, which, in addition to the heating loops 31 arranged on the bottom of the support ceramic 19, are applied to the support ceramic 19.

Figure 5:
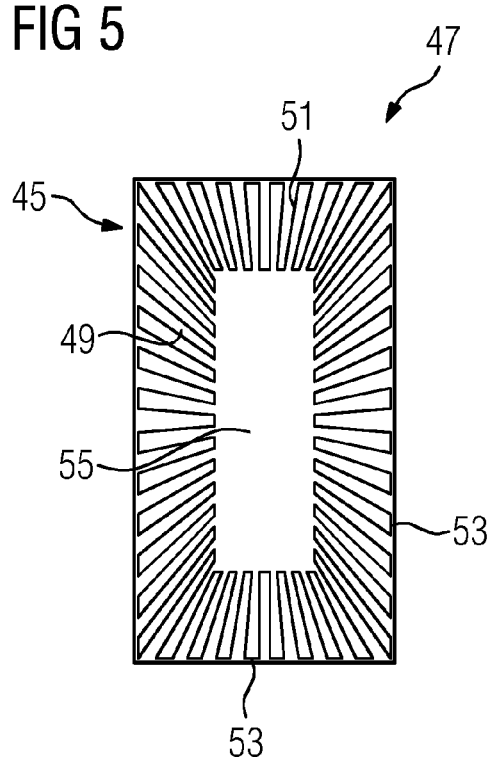
FIG. 5 shows in a plan view a support ceramic of a further sensor board having a heating element arranged on the top of the support ceramic.

FIG. 5 shows a further support ceramic 45 of a sensor board 47 in a plan view. In the present case only one heating element 51 designed as a meander-shaped heating loop is included on the top 49 of the support ceramic 45, and this encircles the support ceramic 45. The segments 53 of the heating meander 51 are oriented in such a way that they purposefully counteract a heat gradient and simultaneously serve as a heating resistor for temperature stabilization. When fitted in a sensor board or a detector module the heating element 51 therefore enables an improvement in the heat flow on the one hand and simultaneously the dissipation of the heat produced in a sensor layer into the region 55 within the encircling heating meander 51, from where the heat can then be dissipated by way of a coupled module support.

Figure 6:
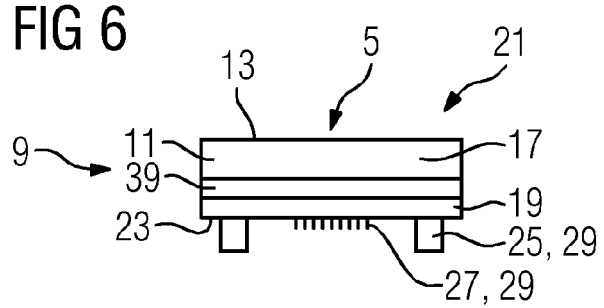
FIG. 6 shows in a side view a detail of a stack formation including a metal coating.

FIG. 6 shows a detail 21 of a stack formation 9 of sensor boards 5 having the sensor layer 11, read unit 17 and support ceramic 19. At least one heat-conducting coating 39 is arranged on the support ceramic 19. Connectors 25 and passive elements 27 are arranged on the bottom 23 of the support ceramic 19.

Figure 7:
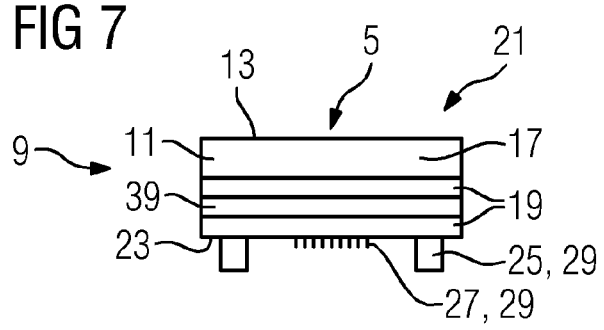
FIG. 7 shows in a side view a detail of a stack formation including a metal coating.

FIG. 7 shows a detail 21 of a stack formation 9 of sensor boards 5 having the sensor layer 11, read unit 17 and support ceramic 19. At least one heat-conducting coating 39 is embedded in the support ceramic 19. Connectors 25 and passive elements 27 are arranged on the bottom 23 of the support ceramic 19.

Of course, in addition to the embodiments shown in the present case, all embodiments are also possible in which additional heating elements and/or metal coatings are arranged on a support ceramic arranged or are embedded therein.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a tangible computer readable medium and is adapted to perform any one of the aforementioned methods when run on a computer device (a device including a processor). Thus, the tangible storage medium or tangible computer readable medium, is adapted to store information and is adapted to interact with a data processing facility or computer device to execute the program of any of the above mentioned embodiments and/or to perform the method of any of the above mentioned embodiments.

The tangible computer readable medium or tangible storage medium may be a built-in medium installed inside a computer device main body or a removable tangible medium arranged so that it can be separated from the computer device main body. Examples of the built-in tangible medium include, but are not limited to, rewriteable non-volatile memories, such as ROMs and flash memories, and hard disks. Examples of the removable tangible medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A detector module for an X-ray detector comprising:
a number of sensor boards arranged adjacent to each other on a module support, each of the sensor boards including, in a stack formation,
a sensor layer including a sensor surface, and
a support ceramic, by which the sensor layer is thermally coupled to the module support, wherein a number of elements are arranged in a stack formation on a side of the support ceramic that faces the module support and wherein at least one heating element is included which, in a plane of projection perpendicular to the stack formation, at least partially covers at least an area of the support ceramic that is free from the elements.

2. The detector module of claim 1, wherein the heating element is designed as a meander-shaped heating loop.

3. The detector module of claim 1, wherein the heating element is arranged in a stack formation on at least one of a top and bottom of the support ceramic.

4. The detector module of claim 1, wherein the heating element is embedded in a stack formation in the support ceramic.

5. The detector module of claim 1, wherein at least one heat-conducting coating is arranged on the support ceramic.

6. The detector module of claim 5, wherein a heat-conducting coating is arranged on a top of the support ceramic.

7. The detector module of claim 5, wherein a heat-conducting coating is embedded in the support ceramic.

8. The detector module of claim 5, wherein the at least one heat-conducting coating is made from one or more metals which are chosen from a group that includes copper, nickel, indium, tungsten, aluminum and gold.

9. The detector module of claim 1, wherein a read unit is arranged in a stack formation between the sensor layer and the support ceramic.

10. The detector module of claim 1, wherein the sensor layer comprises a direct-converting semi-conductor material.

11. An X-ray detector for imaging an object penetrated by X-ray radiation, comprising a plurality of detector modules, at least one of the plurality of detector modules being the detector module of claim 1.

12. The X-ray detector of claim 11, wherein the support ceramic is connected in a stack formation via the module support to an electronic sensor device.

13. The detector module of claim 2, wherein the heating element is arranged in a stack formation on at least one of a top and bottom of the support ceramic.

14. The detector module of claim 13, wherein the heating element is embedded in a stack formation in the support ceramic.

15. The detector module of claim 14, wherein at least one heat-conducting coating is arranged on the support ceramic.

16. The detector module of claim 15, wherein a heat-conducting coating is arranged on the top of the support ceramic.

17. The detector module of claim 2, wherein the heating element is embedded in a stack formation in the support ceramic.

18. The detector module of claim 2, wherein at least one heat-conducting coating is arranged on the support ceramic.

19. The detector module of claim 6, wherein a heat-conducting coating is embedded in the support ceramic.

20. The detector module of claim 10, wherein the direct-converting semi-conductor material is cadmium telluride (CdTe) or cadmium zinc telluride (CdZnTe).

* * * * *